United States Patent
Lee et al.

(10) Patent No.: US 9,930,438 B2
(45) Date of Patent: Mar. 27, 2018

(54) ELECTRONIC DEVICE AND METHOD FOR CONTROLLING AUDIO INPUT/OUTPUT

(71) Applicant: Samsung Electronics Co., Ltd., Gyeonggi-do (KR)

(72) Inventors: Dongju Lee, Daegu (KR); Jiwoo Lee, Gyeongsangbuk-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/886,543

(22) Filed: Oct. 19, 2015

(65) Prior Publication Data
US 2016/0112792 A1  Apr. 21, 2016

(30) Foreign Application Priority Data
Oct. 17, 2014  (KR) .......................... 10-2014-0141063

(51) Int. Cl.
H04R 1/10 (2006.01)
H04R 5/04 (2006.01)
H04M 1/60 (2006.01)
H04M 1/725 (2006.01)

(52) U.S. Cl.
CPC ........ H04R 1/1041 (2013.01); H04M 1/6058 (2013.01); H04R 5/04 (2013.01); H04M 1/72558 (2013.01); H04R 2420/05 (2013.01); H04R 2420/07 (2013.01); H04R 2430/01 (2013.01)

(58) Field of Classification Search
CPC .... H04R 1/1041; H04R 5/04; H04R 2420/05; H04R 2420/07; H04R 2430/01; H04M 1/6058; H04M 1/72558
See application file for complete search history.

(56) References Cited

U.S. PATENT DOCUMENTS

| | | | |
|---|---|---|---|
| 9,277,320 B1* | 3/2016 | Hoskins | H04R 5/033 |
| 2007/0041582 A1* | 2/2007 | Lam | H04M 1/6058 |
| | | | 379/441 |
| 2014/0253520 A1* | 9/2014 | Cueto | G06F 3/0383 |
| | | | 345/179 |
| 2015/0043758 A1* | 2/2015 | Yamada | G10K 11/178 |
| | | | 381/151 |
| 2015/0207912 A1* | 7/2015 | Gulliksson | H04M 1/7253 |
| | | | 455/418 |

FOREIGN PATENT DOCUMENTS

| | | | | |
|---|---|---|---|---|
| EP | 2773087 A1 * | 9/2014 | | H04M 1/6058 |
| KR | 101142906 | 5/2012 | | |

* cited by examiner

*Primary Examiner* — Mark Fischer
(74) *Attorney, Agent, or Firm* — The Farrell Law Firm, P.C.

(57) ABSTRACT

An electronic device includes an interface unit that communicates with an external device in wireless or wired communication, a resonance sensor unit that detects a frequency resonance signal of the external device, and a controller that detects at least one input from the external device through the resonance sensor unit, determines an audio input or output activation state of the electronic device in response to the communication connection state with the external device, and controls an audio input or output operation of the electronic device based on the detection of the at least one input and the determination of the audio input/output activation state.

18 Claims, 14 Drawing Sheets

ELECTRONIC DEVICE AND METHOD FOR CONTROLLING AUDIO INPUT/OUTPUT

PRIORITY

This application claims priority under 35 U.S.C. § 119(a) to Korean Patent Application No. 10-2014-0141063, filed on Oct. 17, 2014, the contents of which are incorporated herein by reference.

BACKGROUND OF THE INVENTION

1. Field of the Invention

The present invention relates to a method and an electronic device for controlling audio input/output.

2. Description of the Related Art

Interest has dramatically increased in the use of various external devices that interwork with an electronic device to extend the function of the electronic device. For example, an external audio device such as Bluetooth® earphones or headsets outputs audio signals of the electronic device through wired or wireless speakers, and provides a function such as a speaker while enabling the user to perform various activities. In addition, the audio device is equipped with a control button used to control the audio reproduction and output function of the electronic device, interworking with the electronic device.

As such, conventional electronic devices provide the audio reproduction and output function thereof through the control button of the audio device. However, the control button requires a user input, which prohibits control of the audio input/output of the electronic device through the audio device without the user's control input. In addition, when the user leaves the vicinity of the electronic device after disconnecting the earphones from the electronic device, although the user cannot listen to music, the audio signal continues to be reproduced unless the user inputs the control input, which is inconvenient and is an unnecessary waste of resources.

SUMMARY OF THE INVENTION

The present invention has been made to address the above-mentioned problems and disadvantages, and to provide at least the advantages described below.

Accordingly, an aspect of the present invention is to provide a method and an apparatus for controlling an audio input/output, in which a user's gesture with respect to the external audio device is recognized, and the audio input/output is controlled in response to the recognized user's gesture instead of through the control button of the external audio device that is linked with the electronic device, and an external device supporting the same.

In accordance with an aspect of the present invention, an electronic device includes an interface unit that communicates with an external device in wireless or wired communication, a resonance sensor unit that detects a frequency resonance signal of the external device, and a controller that detects at least one input from the external device through the resonance sensor unit, determines an audio input or output activation state of the electronic device in response to the communication connection state with the external device, and controls an audio input or output operation of the electronic device based on the detection of the at least one input and the determination of the audio input/output activation state.

In accordance with another aspect of the present invention, a method for controlling an audio input or output in an electronic device includes detecting at least one input of an external device through an electromagnetic resonance panel that is electrically connected with the electronic device, determining the execution state of at least one audio input or output function of the electronic device in response to the communication connection state with the external device, and controlling at least one audio input or output function based on the detection of the at least one input and the execution state.

In accordance with another aspect of the present invention, an external device includes a connection interface that communicates with an electronic device, an audio output unit that outputs an audio signal received through the connection interface, and a proximity signal generating unit that is inserted inside the audio output unit, detects a proximity of the electronic device, and generates a proximity signal based on the detected proximity.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Figure 1:
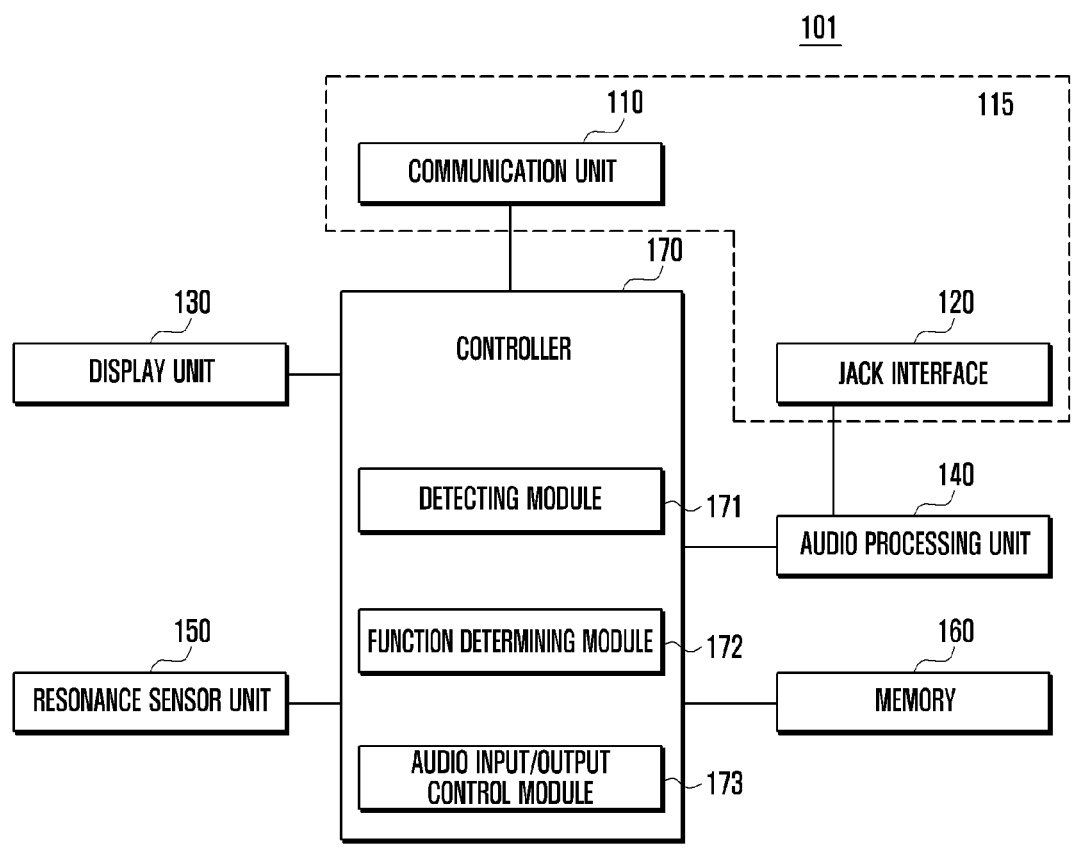
FIG. 1 is a block diagram of an electronic device, according to an embodiment of the present invention.

Hereinafter, embodiments of the present invention will be described in detail with reference to the accompanying drawings. In the following description of the present invention, a detailed description of related well-known functions or structures incorporated herein will be omitted for the sake of clarity and conciseness.

The terms and words used in the present specification and claims should not be interpreted as being limited to their typical meaning based on dictionary definitions thereof, but should be interpreted to have a meaning and concept relevant to the technical spirit of the present invention. Accordingly, the embodiments described in the present specification and constructions shown in the drawings are only embodiments of the present invention, and do not represent the entire technical spirit of the present invention. Therefore, it should be understood that various equivalents and modified embodiments capable of replacing these embodiments may exist.

In various embodiments of the present invention, the electronic device such as a smart phone or tablet personal computer (PCs) is connected to networks through wired/wireless communication, and applications may be freely installed in and deleted from the electronic device. The networks include the Internet and mobile communication networks.

In various embodiments of the present invention, the external audio devices include earphones, headsets, and Bluetooth® devices that are linked to the electronic device in order to thereby control the function of the electronic device to an extent. The external audio device is connected with the electronic device in wired/wireless communication. Hereinafter, the external audio device will be described as earphones, but the present invention is not limited thereto.

According to embodiments of the present invention, the electronic device controls the audio input/output operation through the external audio device by using a proximity state, a contact state, or a non-contact state with respect to the external audio device.

FIG. 1 is a block diagram of an electronic device, according to an embodiment of the present invention.

Referring to FIG. 1, the electronic device 101 includes a communication unit 110, a jack interface 120, a display unit 130, an audio processing unit 140, a resonance sensor unit 150, a memory 160, and a controller 170.

The communication unit 110, under the control of the controller 170, is connected to a network through wireless/wired communication, or performs voice communication, video communication, or data communication with the external audio device through a communication connection between devices. The wireless communication, for example, includes at least one of wireless fidelity (WiFi), Bluetooth® (BT), near field communication (NFC), a global positioning system (GPS), or cellular communication such as long term evolution (LTE), LTE-advanced (LTE-A), code division multiple access (CDMA), wideband CDMA (WCDMA), universal mobile telecommunications network (UMTS), wireless broadband (WiBro), and global system for mobile communications (GSM). The wired communication, for example, includes at least one of a universal serial bus (USB), a high definition multimedia interface (HDMI), recommended standard 232 (RS-232), and plain old telephone service (POTS).

The jack interface 120 supports a wired connection between the external audio device and the electronic device 101. The jack interface 120 includes accepting ports for recognizing the type of external audio device, and the operating status of a control button of the external audio device. The accepting ports include a left sound port, a right sound port, a microphone port, and a ground port. For example, when the jack interface 120 is connected to the earphones through the accepting ports, under the control of the controller 170, the jack interface 120 outputs the audio signal generated from the audio processing unit 140 to earphone speakers, and transmits the audio signal received from an earphone microphone to the audio processing unit 140.

Although the communication unit 110 and the jack interface 120 are described as being separate from each other in the embodiment of the present invention, the jack interface 120 and the communication unit 110 may be configured to be integrated into the interface unit 115.

The display unit 130 displays images or data to the user. The display unit 130 includes a display panel implemented as a liquid-crystal display (LCD) or an active-matrix organic light-emitting diode (AMOLED), and is at least one of flexible, transparent and wearable. The display unit 130 further includes a controller to control the display panel.

The display unit 130 may be combined with the touch panel to be thereby configured as a single module such as in the form of a touch screen. The touch panel, for example, recognizes a touch input by the user by at least one of a capacitive type, a pressure-sensitive type, an infrared type, or an ultrasonic type touch panel.

The audio processing unit 140 encodes and decodes audio or voice signals. The audio processing unit 140 is connected with an audio input device such as a microphone (MIC), an audio output device such as a speaker (SPK), and the external audio device, and encodes voice signals received from the audio input device or transmitted from the external audio device and transmits the encoded voice signals to the controller 170.

The audio processing unit 140 decodes the encoded voice signal received from the controller 170 and converts the decoded voice signal into an analog signal, and outputs the analog signal through the audio output device, or the external audio device that is connected with the jack interface 120 or connected with the communication unit 110 in the wireless communication. The audio processing unit 140 outputs various audio signals such as audio signals created by reproducing MP3 or video files, through the audio output device, or the external audio device that is connected with the jack interface 120 or connected with the communication unit 110 in the wireless communication.

The resonance sensor unit 150 includes a coil such as an electro-magnetic resonance (EMR) coil that generates an induced current due to a change in the magnetic field or receives a frequency resonance signal through the energy tunnel created by a resonance based on a specific frequency, and a capacitor. For example, the resonance sensor unit 150 receives a frequency resonance signal that is generated from the external audio device based on the magnetic field generated on the surface of the device according to the proximity (or contact) of the external audio device coil member. The resonance sensor unit 150 converts the received frequency resonance signal into a digital signal to be transmitted to the controller 170.

According to an embodiment, the resonance sensor unit 150 may be combined with the touch panel of the display unit 130. The resonance sensor unit 150 includes a plurality of signal lines that intersect with each other along the x-axis and y-axis. The controller 170 controls to supply a current to the resonance sensor unit 150 in order to thereby detect the change in the magnetic field. The resonance sensor unit 150 detects the frequency resonance signal generated from the coil of the external audio device through the change in the magnetic field, and recognizes the coordinates of the position detected through the plurality of lines.

According to an embodiment, the resonance sensor unit 150 receives a signal generated based on a dielectric constant that is distinct from the human body. For example, a dielectric material, which is distinct from the human body or has a different dielectric constant from that of the human body, is provided in the external audio device. The electronic device 101 determines whether the signal transmitted through the resonance sensor unit 150 is a proximity signal generated from the human body or from the external audio device.

The memory 160 stores the instructions or data received from the controller 170 or other elements such as the display unit 130 and the communication unit 110 or created by the other elements. For example, the memory 160 stores an operating system (OS) for booting the electronic device 101 and operating the elements mentioned above, at least one application, messages transmitted/received through the network, or the data resulting from the execution of the applications.

The memory 160, for example, includes programming modules, such as a kernel, middleware, an application programming interface (API), or applications. Each of the above-described programming modules may be configured as software, firmware, hardware, or a combination thereof.

The controller 170 receives the instructions from the other elements of the electronic device 101, decodes the received instructions and thereby performs the calculation or the data processing according to decoded instructions. For example, when power is supplied, the controller 170 controls the booting process of the electronic device 101, and executes various application programs stored in the program area in order to perform the function according to the user's configuration. The controller 170 includes one or more application processors (APs), or one or more communication processors (CPs).

The controller 170 includes a detecting module 171, a function determining module 172, and an audio input/output control module 173.

The detecting module 171 detects the insertion of the jack plug of the external audio device into the jack interface 120. The detecting module 171 detects a voltage value received through a connection with the external audio device and thereby recognizes the type, connection status, or operation status of the external audio device. The detecting module 171 recognizes the communication connection with the external audio device, and transmits the identified information to the function determining module 172.

The detecting module 171 detects the proximity control input of the external audio device when a frequency resonance signal is generated through the resonance sensor unit 150.

The detecting module 171 determines the type of proximity control input of the external audio device based on the frequency of the frequency resonance signal. For example, the detecting module 171 determines whether the frequency of the frequency resonance signal is the first resonance signal (e.g., the signal generated from the right earpiece) or the second resonance signal (e.g., the signal generated from the left earpiece).

The detecting module 171 determines whether the frequency resonance signal is generated from a single earpiece or two earpieces. The detecting module 171 transmits the detection information of the proximity control input and the type information thereof to the function determining module 172 and the audio input/output control module 173.

The function determining module 172 determines the execution state of the audio input/output function, and determines the running function or application. The audio input/output function (or the application) may be the reproducing of multimedia files such as audio sources or videos, a digital mobile broadcasting (DMB) function, a call function, or a voice recording function, but is not limited thereto, and includes a function or application that requires the audio output or the audio input through the MIC.

The function determining module 172 determines whether an audio output function or an audio input function is in progress.

According to an embodiment, if the communication connection with the external audio device is not recognized after the proximity control input is detected, the function determining module 172 may discover the external audio device through the wireless communication, and determine the external audio input/output function of the external audio device connected through the wireless communication.

The function determining module 172 transfers the audio input/output function and the execution state thereof to the audio input/output control module 173.

The audio input/output control module 173 controls the audio input/output function of the electronic device 101 based on the proximity control input of the external audio device and the execution state of the audio input/output function. The electronic device 101 may configure the audio control operations to be different from each other depending on the audio input/output control function, and may configure the audio control operations such that a plurality of audio control operations may be performed in response to a single audio input/output function.

Table 1 below shows the audio control operation configured based on the audio input/output function. This is only an example, however, and the present invention may vary in terms of the audio input/output function or the configuration operation.

TABLE 1

| Audio input/output function | Audio control operation |
| --- | --- |
| Reproduce music (screen-on/off state) | Reproduce music, Stop, Virtual sound effect ON/OFF |
| Reproduce video (screen-on state) | Stop video reproduction |
| DMB watching function | Mute (earphone output off) |
| Call function | Speaker mode ON/OFF |
| Execute App involving audio input/output function | Reduce volume or Mute |

According to an embodiment, the electronic device 101 separates the frequency of the frequency resonance signal of the external audio device and configures the audio control operations depending on the frequency. In the external audio device, such as the earphones, the coil inserted into a user's left ear is a different type than the coil inserted into the user's right ear in order to induce the frequency resonance signals that have different resonance frequency bands from each other.

For example, the external audio device adjusts the coil gap, the number of windings, or the sectional area of the coil such that the left earpiece and the right earpiece of the headphones have different resonance frequency bands from each other. The electronic device 101 separates the frequency and thereby distinguishes the first resonance signal generated by the left earpiece from the second resonance signal generated by the right earpiece.

Table 2 below shows a configuration of a plurality of audio control operations in response to the audio input/output function. This is only an example, however, and the audio control operations of the present invention may vary in terms of the audio input/output function.

TABLE 2

| Audio input/output function | Type of proximity control input | Audio control operation |
|---|---|---|
| (e.g.,) Reproduce audio source | Right ear head | Stop audio source reproduction |
| | Left ear head | Change sound output mode (e.g., change the sound output from stereo output mode into mono output mode) |
| | (Add) Both earpieces | Display audio source function control interface |

The audio input/output control module 173 performs a plurality of audio control operations configured according to the type of proximity control input with respect to the external audio device.

As shown in Table 2, the audio input/output control module 173 configures the audio input/output control operations to be different from each other according to the left channel or right channel direction of the earpiece, and then configures the audio input/output control operations to be different from each other according to the number of earpieces.

Figure 2:
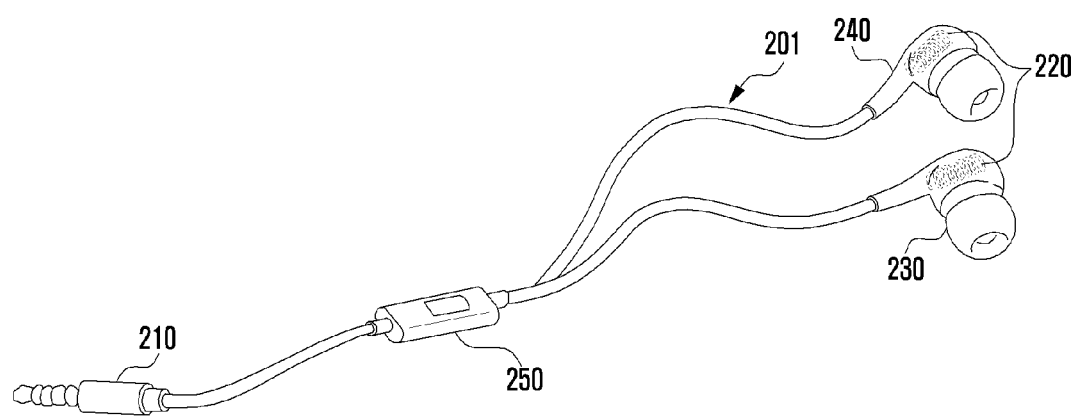
FIG. 2 is a structural diagram of an external audio device, according to an embodiment of the present invention.

FIG. 2 is a structural diagram of the external audio device, according to an embodiment of the present invention.

Referring to FIG. 2, the external audio device 201 are shown as being wired earphones, but the present invention is not limited thereto. The earphones 201 illustrated in FIG. 2 include a jack plug 210, earpieces 230 and 240 supporting a two-channel sound output, and a control button 250.

The jack plug 210 is connected to the jack interface of the electronic device, and includes one or more connecting ports that are connected to the accepting ports of the jack interface 140 to transmit and receive signals. The jack plug 210 may be inserted into the jack interface 120 of the electronic device 101, which recognizes the insertion of the earphones 201 through a change in the voltage generated due to the connection between the connecting port of the jack plug 210 and the accepting port of the jack interface 120.

The control button 250 supports a voice call function of the electronic device 101. When an input signal of the control button 250 of the earphones 201 is received after the call connection signal is received, the electronic device 101 performs a call connection with the other user through the earphones 201. For example, the electronic device 101 receives the user's voice input from the microphone of the earphones 201, and outputs the other user's voice input through the earpieces 230 and 240 of the earphones 201.

The first earpiece 230 and the second earpiece 240 separate the audio signals received from the electronic device 101 into 2-channel audio signals and output the 2-channel audio signals. The first earpiece 230 and the second earpiece 240 include coil members 220 that support the audio input/output control inputs of the electronic device 101.

The coil members 220 may be configured to have the same or different resonant frequency bands from each other by adjusting the coil gap, the number of windings, or the sectional area of the coil. The coil members 220 create an induced current based on the magnetic field generated in the electronic device 101, and create a frequency resonance signal having a constant frequency band through the generated induction current.

As described above, the earphones 201 including the coil members 220 control the audio input/output operation related to the audio input/output function of the electronic device 101. The user causes the earpieces 230 and 240 of the earphones 201 to contact the electronic device 101, for example, in order to stop the reproduction of the content so that the audio input/output function with respect to the earphones 201 or the electronic device 101 can be easily controlled.

Figure 3:
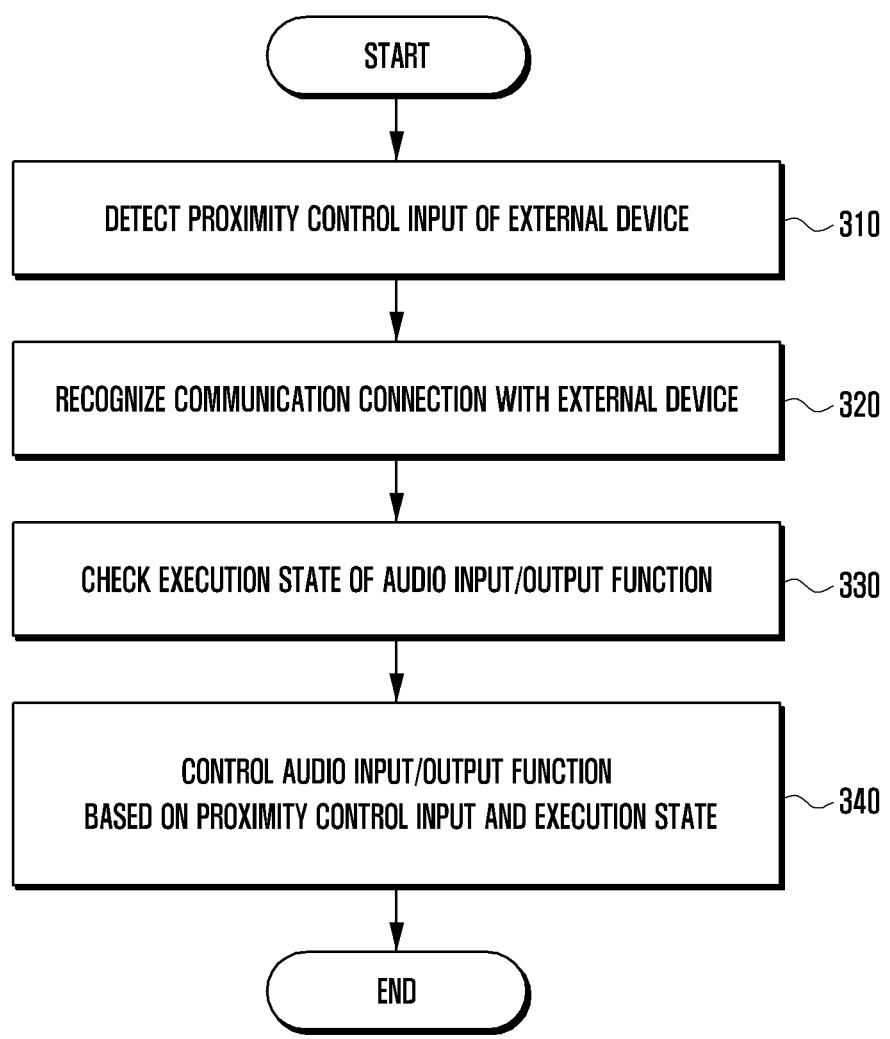
FIG. 3 illustrates a method for controlling the audio input/output of an electronic device using an external audio device, according to an embodiment of the present invention.

FIG. 3 illustrates a method for controlling the audio input/output of the electronic device using the external audio device, according to an embodiment of the present invention.

Referring to FIG. 3, in step 310, the controller 170 or the electronic device detects the proximity control input of the external audio device.

The external audio device includes the EMR coil members in order to detect the proximity with respect to other devices. For example, if the external audio device is the earphones 201 as illustrated in FIG. 2, the coil members 220 are built in the earpieces 230 and 240. An induced current is generated in the coil members 220 of the external audio device by the magnetic field created on the surface of the touch screen due to the proximity of the coil members 220 and the resonance sensor unit of the electronic device.

The external audio device creates a frequency resonance signal based on the generated induction current. The resonance sensor unit 150 of the electronic device receives the created frequency resonance signal from the external audio device, and converts the received frequency resonance signal into a digital signal that is transferred to the controller. The controller detects the proximity control input of the external audio device based on the status of the magnetic field, the strength of the signal, or the resonance frequency of the frequency resonance signal. The controller 170 receives the frequency resonance signal while the display unit 130 is turned off, and detects the proximity control input of the external audio device.

In step 320, the controller 170 recognizes the communication connection with the external audio device. For example, the detecting module 171 of the controller 170 recognizes that the external audio device has been inserted into the jack interface based on the change in the voltage due to the connection of the jack plug.

In step 330, when the communication connection with the external audio device is established, the controller 170 checks the execution state of the audio input/output function. For example, based on the recognition of the communication connection with the external audio device, the controller 170 determines whether the audio input function or the audio output function is in progress among the audio input/output functions through a running application.

According to an embodiment, based on the recognition of the communication connection with the external audio device, if the audio input/output function is not in progress, the controller 170 determines the audio input/output function determined according to the configuration. The controller 170 automatically executes the audio input/output function based on the priority information on the audio input/output function or configuration information thereon in the electronic device. In step 340, the controller 170 controls the audio input/output function based on the proximity control function of the external audio device and the execution state of the audio input/output function.

For example, the controller 170 performs the configured audio control operation in response to the proximity control input of the external audio device. If the audio output function is executed, the controller 170 selects at least one of a stereo mode, a monaural mode, a virtual sound effect mode, a mute mode, a speaker mode, or a volume control mode in response to the proximity control input according to the execution state.

For another example, if the audio input function is executed, the controller 170 controls to receive an audio input through the external audio device, or to receive an audio input through the internal microphone of the electronic device, in response to the proximity control input.

Figure 4A:
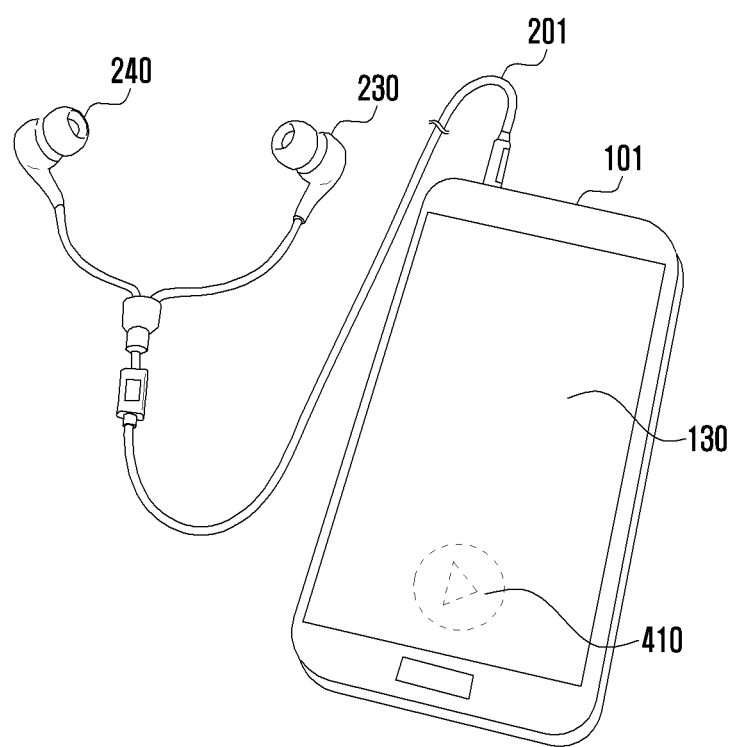
FIGS. 4A-4B illustrate an audio input/output controlling operation using an external audio device, according to an embodiment of the present invention.
Figure 4B:
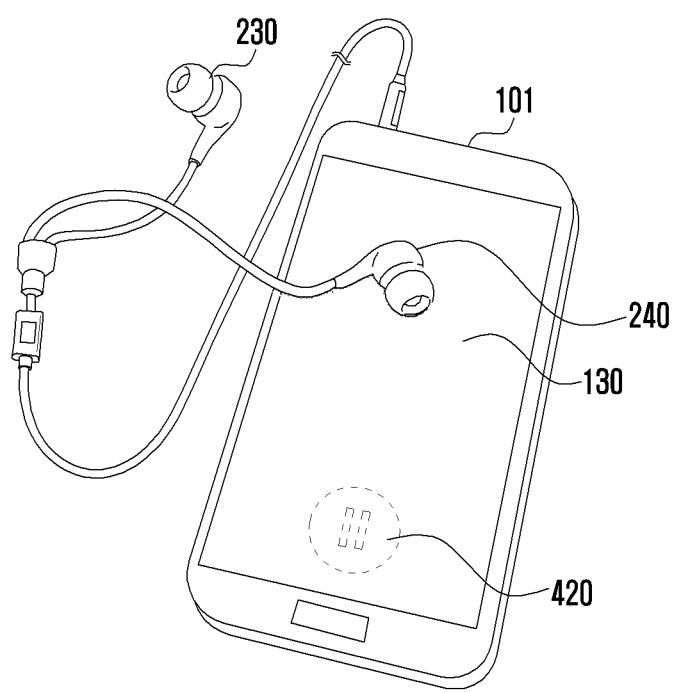

FIGS. 4A-4B illustrates the audio input/output controlling operation using the external audio device, according to an embodiment of the present invention.

Referring to FIGS. 4A-4B, the electronic device 101 outputs the multimedia audio signal through the speakers of the earphones 201. When the earphones 201 are inserted, the electronic device 101 changes the audio output mode from an internal speaker mode of the electronic device 101 into an earphone output mode. The electronic device 101 maintains the earphone output mode while the display unit 130 is turned off. As shown in FIG. 4A, the electronic device 101 controls to turn off the display unit 130 after a predetermined period of time when the audio source is output through the earpieces 230 and 240 of the earphones 201. An icon reproduction object 410 on the display unit 130 is illustrated in FIG. 4A in order to explain the functional state of the electronic device, and the display unit 130 is in the turn-off state.

The user controls the stop operation for the running multimedia audio source using the earphones 201. As shown in FIG. 4B, the user places earpiece 240 of the earpieces 230 and 240 on the display unit 130 while the user listens to the music through the earphones 201.

The electronic device 101 then detects the proximity control input of the earpiece 240 based on the frequency resonance signal created by the reaction between the coil member built into the earpiece 240 and the resonance sensor unit of the electronic device 101. The electronic device 101 determines the frequency resonance signal generated according to the proximity of the earpiece, and determines the control operation configured according to the execution state of the audio input/output function and the proximity control input.

The electronic device 101 determines that the audio source is in reproduction, and as shown in FIG. 4B, controls to stop the reproduction of the audio source. An audio source stop object 420 on the display unit 130 is illustrated in FIG. 4B in order to explain the functional state of the electronic device, and the display unit 130 is in the turn-off state.

As described above, if the user wishes to leave the vicinity of the electronic device 101 while the audio source is in reproduction through the earphones 201, or if the audio source no longer needs to be reproduced, the user may stop the reproducing of the audio source by placing one earpiece 240 of the earphones 201 on the display unit 130.

Figure 5A:
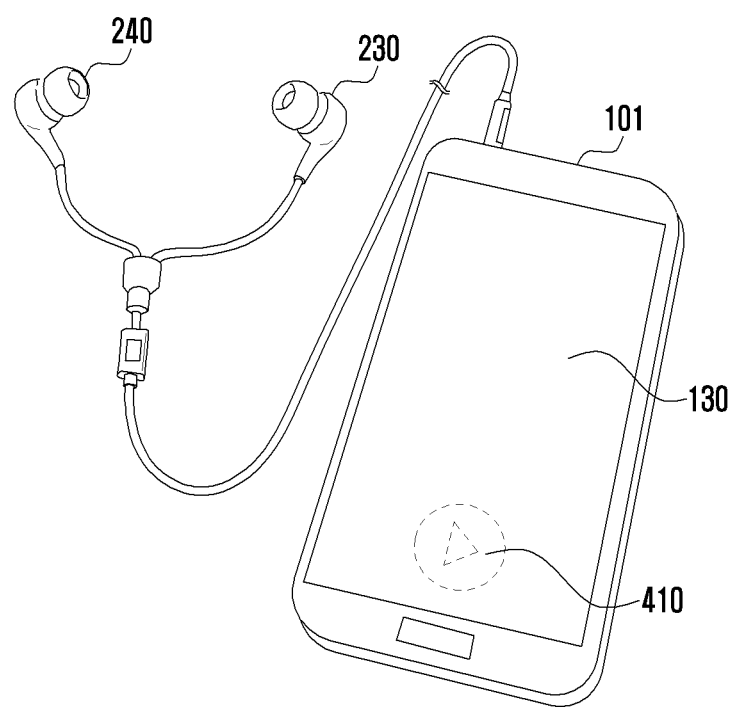
FIG. 5A-5B illustrate an audio input/output controlling operation of an electronic device, according to an embodiment of the present invention.
Figure 5B:
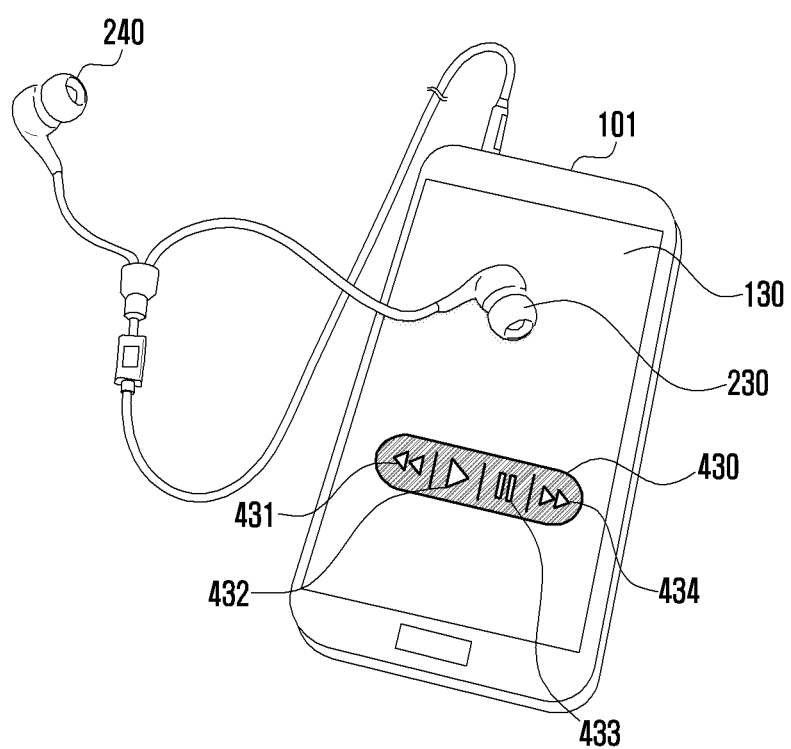

FIGS. 5A-5B illustrate an audio control operation of the electronic device, according to an embodiment of the present invention.

Referring to FIGS. 5A-5B, the electronic device performs the control operation of the configured audio input/output function in response to the proximity control input of the external audio device.

As illustrated, the electronic device displays a user interface object 410, 430 related to the audio input/output function on the display unit, in response to the proximity control input of the external audio device. The user interface object includes at least one of a multimedia file information panel, a reproduction control panel, a call control panel, or a record control panel.

For example, as shown in FIG. 5A, the multimedia audio source is output through the speakers of the earphones while the display unit 130 of the electronic device 101 is in the turn-off state. The icon reproduction object 410 on the display unit 130 is illustrated in order to explain the functional state of the electronic device.

As shown in FIG. 5B, one earpiece 230 of the earphones is placed on the display unit 130 while the user listens to the audio source through the earphones 201. The electronic device 101 then detects the proximity control input of the earphones 201, and displays a control user interface (UI) 430 for controlling a detailed function related to the running audio source on the display unit 130 in response to an input on the UI. For example, the control UI includes function control objects, such as a previous-file reproduction item 431, a reproduction item 432, a pause item 433, and a next-file item 434, in relation to the reproduction of the audio source.

The electronic device performs the control operation of the following audio input/output function in response to the proximity control input of external audio device according to the configuration.

According to various embodiments, the electronic device is configured to change the audio output mode in response to the proximity control input of the external audio device. When the proximity of the earpiece to the display unit 130 is detected while the audio source is in reproduction, the electronic device controls to change the mode from a stereo channel output mode in which the audio source is output through two channels into a mono channel output mode in which the audio source is output through a single channel. Alternatively, when the proximity of the earpieces is detected while the audio source is output through the earphones in a virtual sound effect mode such as a virtual 5.1 channel effect mode, the electronic device controls to change the audio output mode into a sound effect mode that conforms to one earpiece.

According to various embodiments, the electronic device may be configured to change a call voice output mode in response to the proximity control input of the external audio device when the earphone-based call function is executed. When the proximity control input of the earpieces is detected while a call connection is performed with the other party through the earphones, the electronic device controls to change the earphone output mode into an internal speaker output mode of the electronic device in response to the same.

According to various embodiments, when the proximity control input is detected while the electronic device connects a call, or while the audio input function is in progress in order to receive a voice signal during the voice-recording, the electronic device performs the control operation of the audio input function in response to the input. For example, the electronic device changes the input mode from the earphone microphone input mode into the electronic device internal microphone input mode. When the user places one earpiece on the electronic device while the user performs a call connection with the other user through the earphones, the sound of the voice signal input through the earphones may weaken. In this case, the electronic device measures the sound pressure of a voice received through the internal microphone and the earphone microphone and compares the sound pressure of the internal microphone with the sound pressure of the earphone microphone. If the sound pressure of the internal microphone is greater than the sound pressure of the earphone microphone, the electronic device controls to receive the voice signal and to perform the call connection through the internal microphone. If the sound pressure of the earphone microphone is greater than the sound pressure of the internal microphone, the electronic device receives the voice signal through the earphone microphone.

Figure 6:
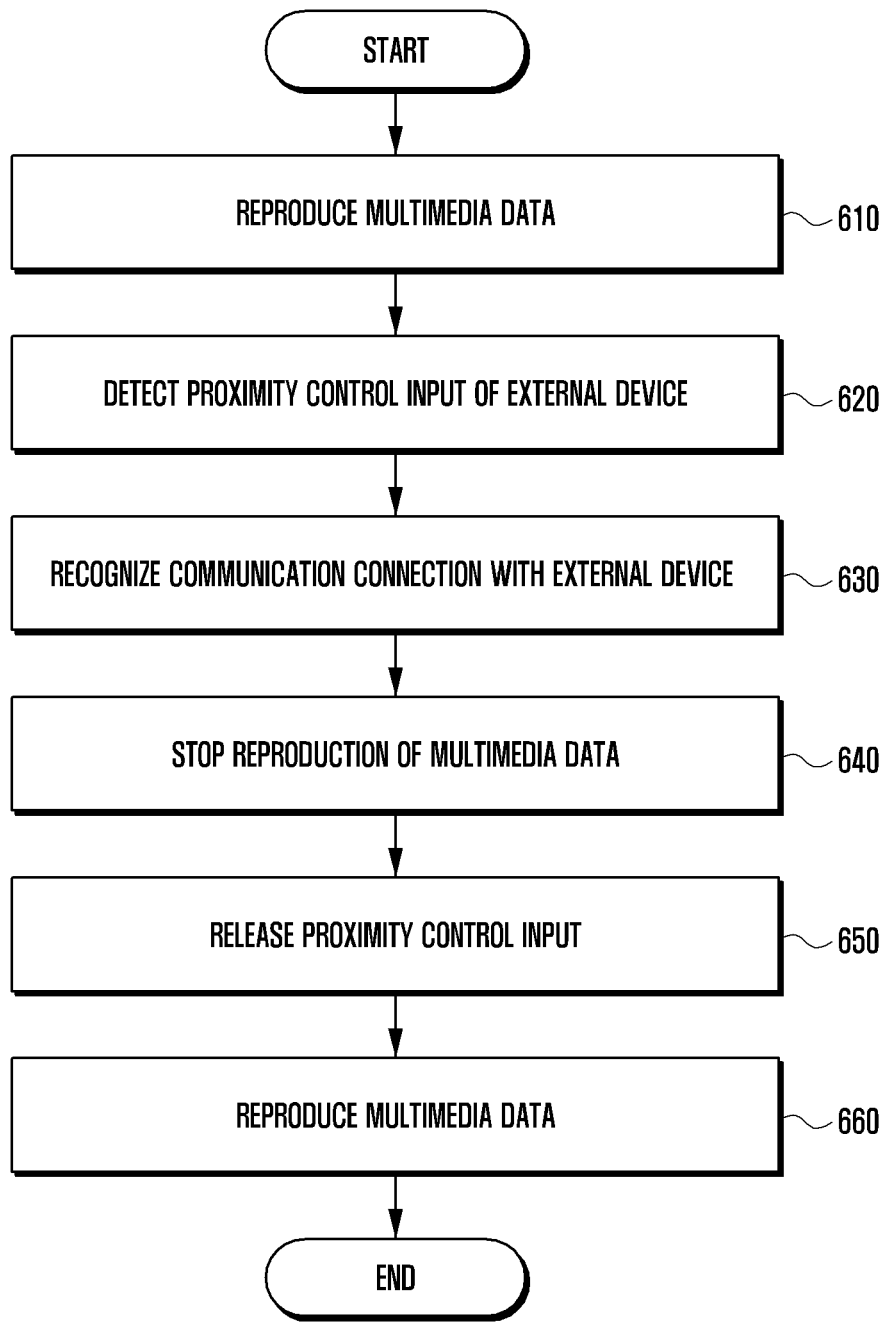
FIG. 6 illustrates a sound controlling operation of an electronic device, according to an embodiment of the present invention.

FIG. 6 illustrates a sound control operation of an electronic device, according to an embodiment of the present invention.

Referring to FIG. 6, in step 610, the controller determines that the multimedia reproducing function is in progress. In this case, the display unit 130 is in the turn-off state, and the electronic device outputs the multimedia audio signal in the earphone output mode.

In step 620, the controller 170 detects the proximity control input of the external audio device while the multimedia reproducing function is in progress. In step 630, the controller 170 recognizes a communication connection with the external audio device, and in step 640, the controller 170 controls to stop the reproduction of the multimedia audio source in response to the proximity control input. In this case, the electronic device maintains the turn-off state of the display unit, or displays, on the display unit 130, an object showing that the reproduction of the multimedia audio source has been stopped.

In step 650, the controller 170 detects the release of the proximity control input of the external audio device when the multimedia reproduction is stopped. For example, when the user moves the external audio device far away from the electronic device, the frequency resonance signal generated due to the proximity between the external audio device and the electronic device 101 may not occur. Thus, the controller 170 recognizes the release of the proximity control input generated by the proximity of the external audio device.

In step 660, in response to the release of the proximity control input of the external audio device, the controller 170 controls to reproduce the multimedia audio source that has been stopped.

The embodiment of FIG. 6 relates to the reproducing and stopping of the multimedia audio source, but the present invention is not limited thereto.

According to various embodiments, when the proximity of the external audio device is detected while the audio output function through the external audio device is in progress, the electronic device controls to stop the audio output function through the external audio device. When a request for executing another audio input/output function is received while the audio output is stopped, the electronic device controls to execute another audio input/output function in response to the release of the proximity input.

For example, when the proximity control input of the external audio device is detected while the audio source is in reproduction through the earphones, the electronic device controls to stop the reproduction of the audio source. Thereafter, the electronic device receives a request for a call connection from the other electronic device when the audio source is stopped. In response to the release of the proximity control input, the electronic device accepts the request for a call connection and performs the call connection with a user of the other electronic device through the external audio device.

Figure 7:
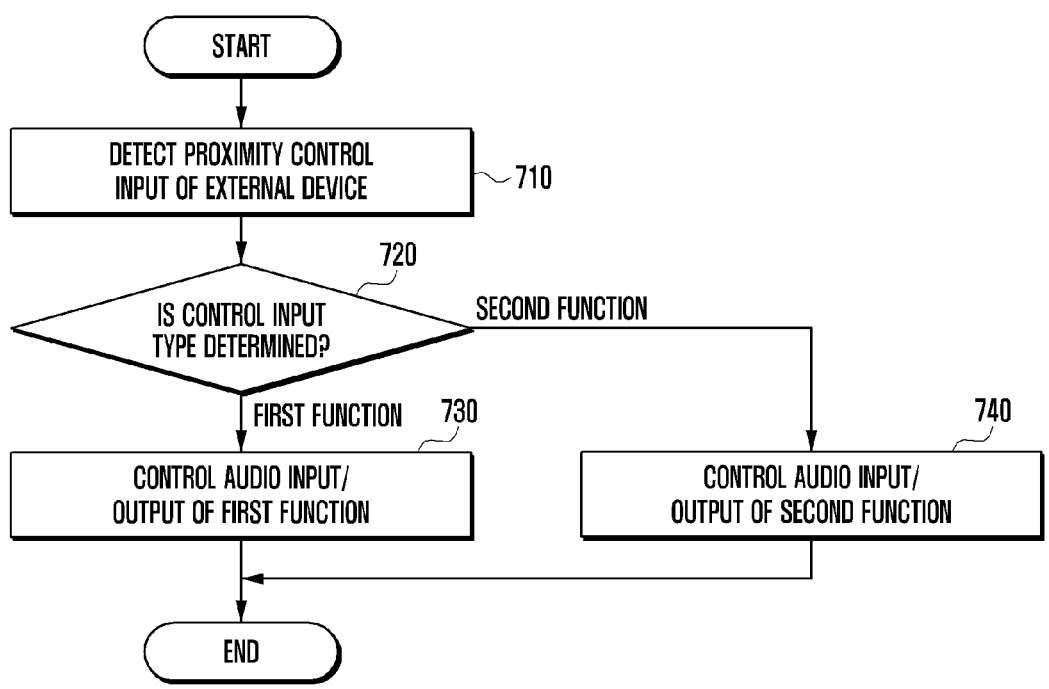
FIG. 7 illustrates an audio input/output controlling operation of an electronic device, according to an embodiment of the present invention.

FIG. 7 illustrates an audio control operation of the electronic device, according to an embodiment of the present invention.

Referring to FIG. 7, in step 710, the controller 170 detects the proximity control input of the electronic device, which is performed in the same manner as step 310 of FIG. 3. Thus, the detailed description thereof will be omitted.

In step 720, the controller 170 determines the type of the detected proximity control input. For example, the controller 170 determines the resonance frequency of the frequency resonance signal generated due to the resonance with respect to the external audio device, and determines whether the resonance frequency is the first resonance signal generated from the first earpiece or the second resonance signal generated from the second earpiece. In addition, the controller 170 determines whether the proximity control input is the type of signal generated from one or two earpieces.

According to an embodiment, after determining that the proximity control input is a single earpiece signal type, the controller 170 determines whether the proximity control input signal is generated from the right channel earpiece or the left channel earpiece.

In step 730, when the proximity control input is based on the first resonance signal (e.g., the first function type), the controller 170 performs the first audio input/output control operation. For example, when the proximity control input generated from the first earpiece is detected while the video reproduction function is in progress, the controller 170 controls to stop the video reproduction function.

In step 740, when the proximity control input is based on the second resonance signal (e.g., the second function type), the controller 170 performs the second audio input/output control operation. For example, when the proximity control input generated from the second earpiece is detected while the video reproduction function is in progress, the controller 170 controls to display the control objects related to the video reproduction function, such as 430 in FIG. 5B.

Figure 8A:
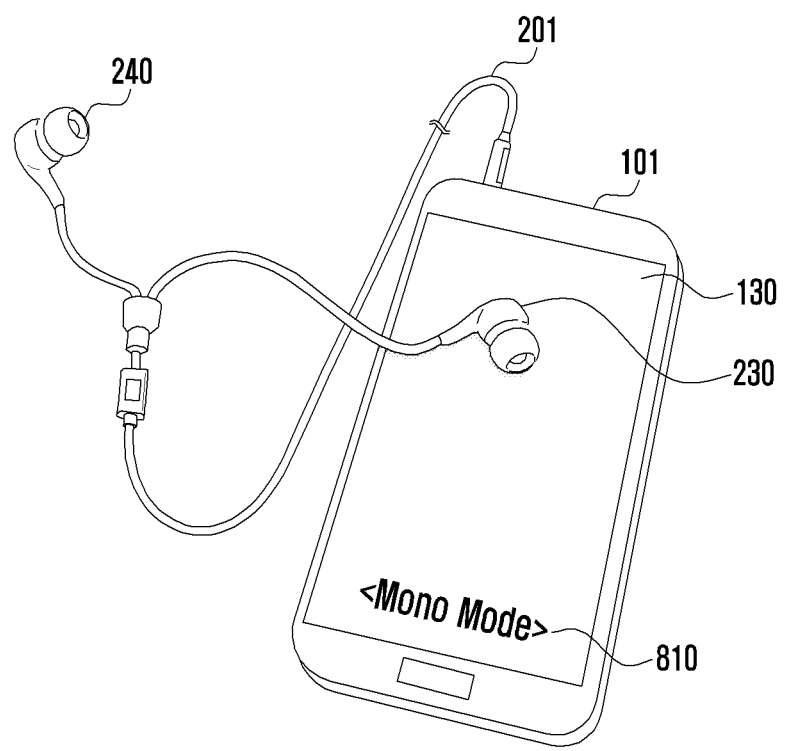
FIGS. 8A-8B illustrate configuring a proximity control input using an external audio device, according to an embodiment of the present invention.
Figure 8B:
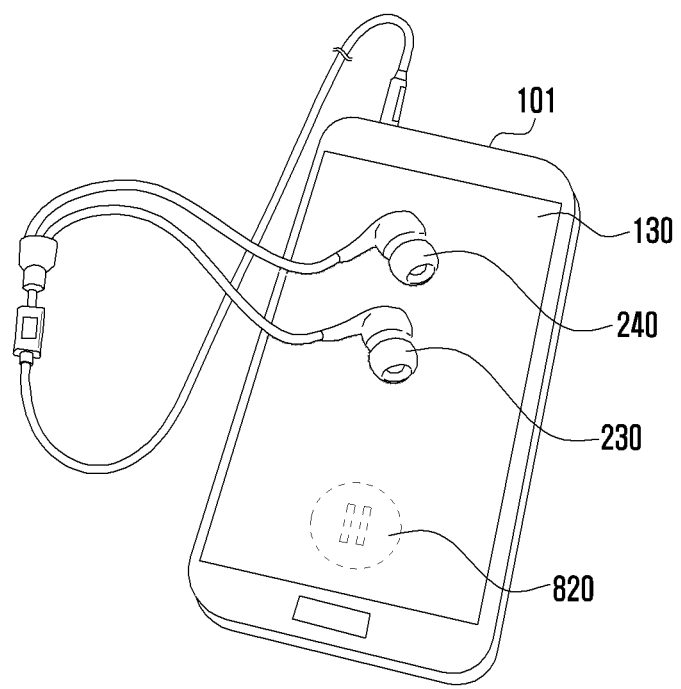

FIGS. 8A-8B illustrate configuring the proximity control input using the external audio device, according to an embodiment of the present invention.

Referring to FIGS. 8A-8B, the electronic device 101 is configured to distinguish the proximity control inputs from each other in order to thereby perform a plurality of audio input/output control operations in relation to the audio input/output function. For example, the electronic device determines whether the frequency resonance signal is generated from one or two earpieces. The electronic device executes the first configured audio control operation in response to the resonance signal generated from a single earpiece.

For example, the electronic device outputs the audio source through the speakers of the earphones in the virtual 5.1 channel sound effect output mode. In this state, as shown in FIG. 8A, if the user places one of the earpieces on the display unit 130 of the electronic device 101 while reproducing the audio source, the electronic device 101 recognizes that the audio source is output through a single earpiece, and controls to change the virtual sound effect output mode into the mono output mode in which the audio source is output through a single channel.

The electronic device performs the second configured audio control operation in response to the resonance signal generated from the two earpieces. For example, as shown in FIG. 8B, if the user places two earpieces 230 and 240 on the display unit 130 of the electronic device 101 while reproducing the audio source, the electronic device 101 controls to stop the reproduction of the audio source.

Figure 9A:
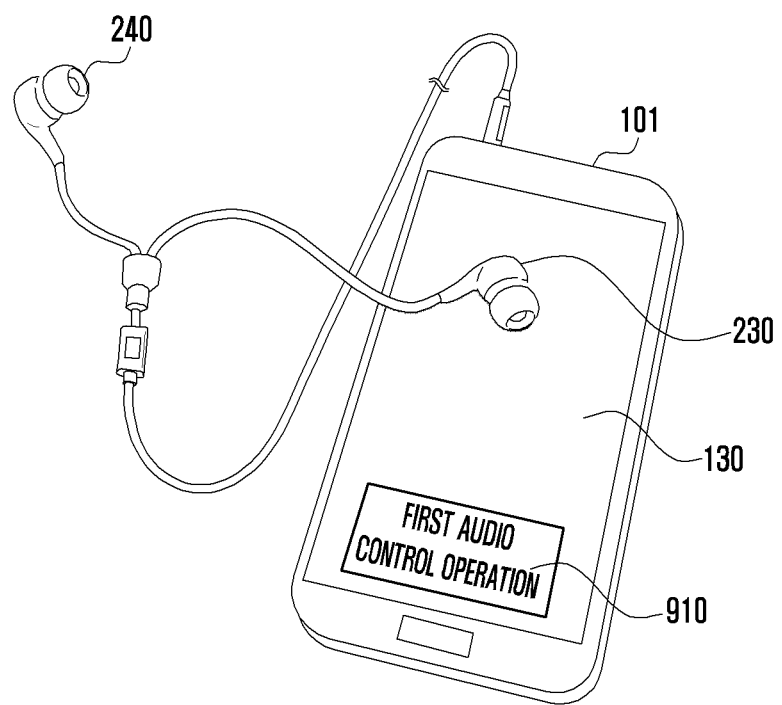
FIGS. 9A-9B illustrate configuring a proximity control input using an external audio device, according to an embodiment of the present invention.
Figure 9B:
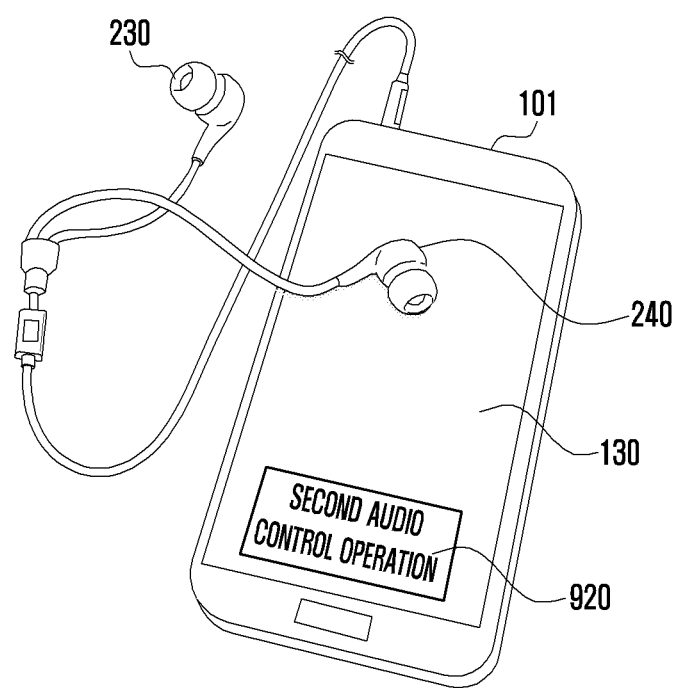

FIGS. 9A-9B illustrate configuring the proximity control input using the external audio device, according to an embodiment of the present invention.

Referring to FIGS. 9A-9B, the external audio device includes coil members that have different frequency channels from each other and are included in the first earpiece 230 that outputs the right channel audio signal and the second earpiece 240 that outputs the left channel audio signal, respectively. In this case, the electronic device 101 distinguishes the frequency resonance signal generated from the first earpiece 230 from the frequency resonance signal generated from the second earpiece 240.

The electronic device 101 determines whether the proximity control input of the external audio device is created from the first earpiece 230 or the second earpiece 240, and performs the configured audio input/output control operation according to the frequency of the proximity control input. As shown in FIG. 9A, if the user places the first earpiece 230 on the display unit 130, the electronic device 101 performs the first audio control operation 910 related to the audio input/output function. As shown in FIG. 9B, if the user places the second earpiece 240 on the display unit 130 of the electronic device 101, the electronic device 101 performs the second audio control operation 920 related to the audio input/output function. Operation displaying objects 910 and 920 displayed on the display unit 130 in FIGS. 9A and 9B are illustrated for convenience of explanation, and may or may not be displayed.

According to various embodiments, the electronic device 101 may be configured to distinguish the proximity control inputs of the external audio device in order to thereby perform a plurality of audio control operations in relation to the audio input/output control function. For example, the electronic device may simultaneously configure the first audio control operation corresponding to the first earpiece 230, the second audio control operation corresponding to the second earpiece 240, and a third audio control operation corresponding to two earpieces.

Figure 10:
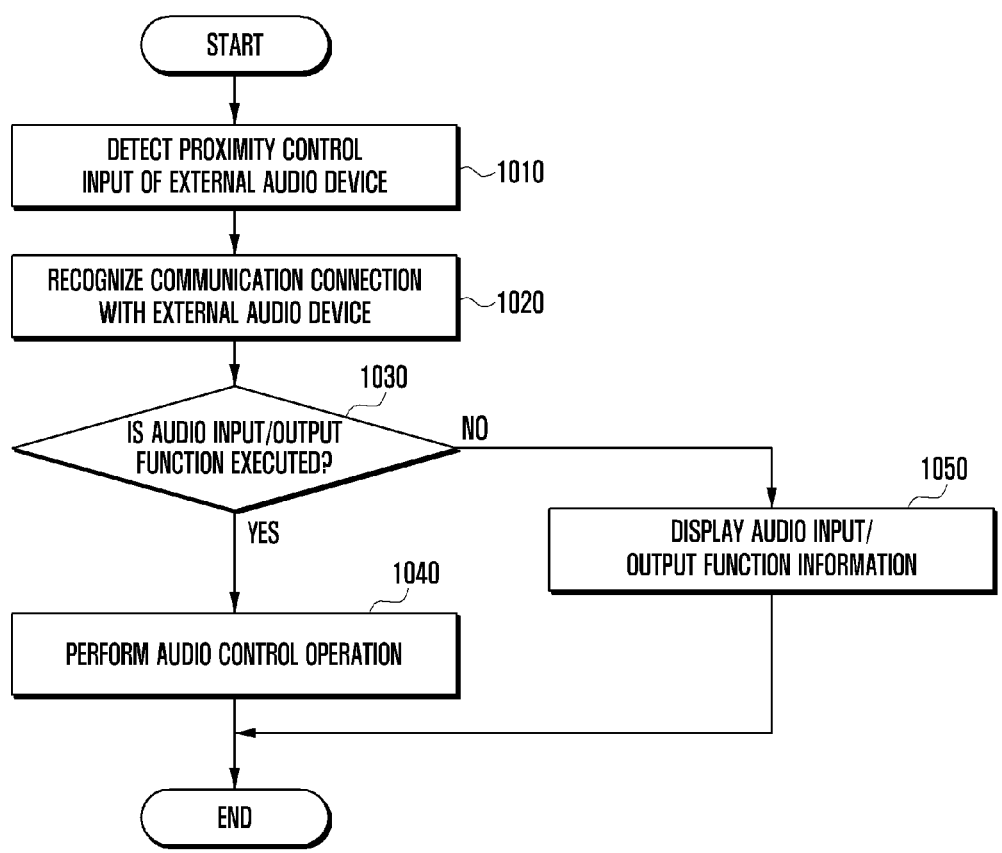
FIG. 10 illustrates an audio input/output controlling operation of an electronic device, according to an embodiment of the present invention.

FIG. 10 illustrates the audio control operation of the electronic device, according to an embodiment of the present invention.

Referring to FIG. 10, in step 1010, the controller of the electronic device detects the proximity control input of the external audio device. In step 1020, the controller recognizes a communication connection with the external audio device, and in step 1030, the controller determines whether or not to execute the audio input/output function, which may be a function or an application (App) to support the audio input/ output, such as reproducing music or video, recording, and a DMB watching function.

In step 1040, if the controller executes the audio input/ output function, the controller performs the configured audio control operation corresponding to the running audio input/ output function in response to the proximity control input of the external audio device.

In step 1050, if the controller does not execute the audio input/output function, the controller displays, on the display unit 130, the audio input/output function information that is executable in the electronic device in response to the proximity control input of the external audio device.

For example, the audio input/output function information includes at least one of a multimedia file information panel, a reproduction control panel, a call control panel, or a record control panel.

For another example, when the proximity control input of the external audio device is detected while the display unit 130 is turned off, the controller displays, on the display unit, an audio output function list including, for example, an audio source reproduction execution item, a video reproduction execution item, a DMB function execution item, a recording function execution item, or a call function execution item. Afterwards, the controller determines the audio input/output function selected by the user from the audio output function list, and executes the identified audio input/ output function.

The embodiments disclosed in the detailed description and drawings are provided to readily describe and to assist in a thorough understanding of the present invention, and are not intended to limit the scope of the present invention. Therefore, it should be understood that all modifications or modified forms drawn by the technical idea of the present invention in addition to the embodiments disclosed herein are included in the scope of the present invention.

Although the present invention has been described above using specific terms in connection with the certain embodiments disclosed in the specification and drawings, it will be understood by those skilled in the art that various changes in form and details may be made therein without departing from the scope of the present invention. Therefore, the scope of the present invention should not be defined as being limited to the embodiments, but should be defined by the appended claims and equivalents thereof.

What is claimed is:

1. An electronic device comprising:
an interface unit that communicates with an external device in wireless or wired communication;
a resonance sensor unit that detects a frequency resonance signal which is generated according to the external device approaching or contacting the electronic device or releasing contact with the electronic device; and
a controller that detects at least one input from the external device through the resonance sensor unit, determines an audio input or output activation state of the electronic device in response to a communication connection state with the external device, and controls an audio input or output operation of the electronic device based on the detection of the at least one input and the determination of the audio input/output activation state.

2. The electronic device of claim 1, wherein the resonance sensor unit comprises an electromagnetic resonance panel, and receives a frequency resonance signal of at least one of a first resonance signal and a second resonance signal, which have different frequency bands generated due to a proximity between the external device and the electromagnetic resonance panel.

3. The electronic device of claim 1, wherein if an audio output function is in progress, the controller controls the audio output function in at least one of a stereo mode, a monaural mode, a virtual sound effect mode, a mute mode, a speaker mode, and a volume control mode in response to the at least one input.

4. The electronic device of claim 1, wherein if an audio input function is in progress, the controller controls to determine one audio input among a first voice input through the external device, or a second voice input through the electronic device in response to the at least one input.

5. The electronic device of claim 4, wherein if a measured value of a sound pressure with respect to the first voice input is equal to or less than a critical value, the controller controls to determine the second voice input as the one audio input.

6. The electronic device of claim 1, wherein if a call reception event occurs in the electronic device, the controller performs a call connection with a called or calling party based on detection of a release of the at least one input.

7. The electronic device of claim 1, wherein the interface unit further comprises a jack interface for a wired connection, and a wireless communication interface for a wireless connection, and if the electronic device is not connected with the external device in communication, the controller detects the external device using a wireless communication interface in response to the input, and recognizes a communication connection with the detected external device.

8. The electronic device of claim 1, further comprising a display unit that displays audio input or output information, wherein the controller controls to display, on the display unit, a graphic object for controlling the input or output operation in response to the at least one input.

9. The electronic device of claim 8, wherein the graphic object includes at least one of a multimedia file information panel, a reproduction control panel, a call control panel, and a record control panel.

10. A method for controlling an audio input or output in an electronic device, the method comprising:
   detecting at least one input which is generated according to an external device approaching or contacting the electronic device or releasing contact with the electronic device through an electromagnetic resonance panel that is electrically connected with the electronic device;
   determining an execution state of at least one audio input or output function of the electronic device in response to a communication connection state with the external device; and
   controlling the at least one audio input or output function based on the detection of the at least one input and the execution state.

11. The method of claim 10, wherein detecting the at least one input comprises detecting, as the at least one input, a frequency resonance signal of at least one of a first resonance signal or a second resonance signal, which have different frequency bands generated due to a proximity between the external device and the electromagnetic resonance panel.

12. The method of claim 10, wherein if the audio output function is in progress, the at least one audio input/output function is controlled in at least one of a stereo mode, a monaural mode, a virtual sound effect mode, a mute mode, a speaker mode, and a volume control mode in response to the at least one input.

13. The method of claim 10, wherein if the audio input function is in progress, the at least one audio input or output function is controlled to determine one audio input among a first voice input through the external device, or a second voice input through the electronic device in response to the at least one input.

14. The method of claim 13, further comprising, if a measured value of sound pressure with respect to the first voice input is equal to or less than a critical value, determining the second voice input as the one audio input.

15. The method of claim 10, wherein if a call reception event occurs in the electronic device, the electronic device is controlled to perform a call connection with a called or calling party based on detection of a release of the at least one input.

16. The method of claim 10, wherein if the electronic device is not connected with the external device in communication, determining the execution state further comprises, discovering the external device using a wireless communication interface in response to the input.

17. The method of claim 10, wherein controlling the at least one audio input or output function comprises displaying, at a position adjacent to the input, a graphic object for controlling the input or output operation in response to the at least one input through a display that is electrically connected with the electronic device.

18. The method of claim 17, wherein the graphic object includes at least one of a multimedia file information panel, a reproduction control panel, a call control panel, and a record control panel.

* * * * *